(12) United States Patent
Plank et al.

(10) Patent No.: US 10,876,696 B2
(45) Date of Patent: Dec. 29, 2020

(54) LIGHTING DEVICE FOR A MOTOR VEHICLE HEADLIGHT

(71) Applicant: ZKW Group GmbH, Wieselburg (AT)

(72) Inventors: Josef Plank, Purgstall/Erlauf (AT); Lukas Taudt, Wieselburg (AT); Nina Brauner, Altlengbach (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/470,679

(22) PCT Filed: Jan. 8, 2018

(86) PCT No.: PCT/AT2018/060006
§ 371 (c)(1),
(2) Date: Jun. 18, 2019

(87) PCT Pub. No.: WO2018/132852
PCT Pub. Date: Jul. 26, 2018

(65) Prior Publication Data
US 2020/0088373 A1    Mar. 19, 2020

(30) Foreign Application Priority Data
Jan. 20, 2017  (AT) .................................. 50036/2017

(51) Int. Cl.
*F21S 41/24*    (2018.01)
*F21S 41/172*   (2018.01)
(Continued)

(52) U.S. Cl.
CPC ............. *F21S 41/24* (2018.01); *F21S 41/141* (2018.01); *F21S 41/151* (2018.01);
(Continued)

(58) Field of Classification Search
CPC ........ F21S 41/25; F21S 41/151; F21S 41/337; F21S 41/24–275; F21S 41/141
See application file for complete search history.

(56) References Cited

U.S. PATENT DOCUMENTS

| 8,007,152 B2 | 8/2011 | Nakabayashi |
| 9,046,237 B2 | 6/2015 | Stefanov et al. |

(Continued)

FOREIGN PATENT DOCUMENTS

| DE | 202007001829 U1 | 7/2007 |
| DE | 202013101509 U1 | 6/2013 |

(Continued)

OTHER PUBLICATIONS

Office Action for Austrian Application No. A 50036/2017, dated Aug. 24, 2017 (4 Pages).

(Continued)

*Primary Examiner* — Mariceli Santiago
(74) *Attorney, Agent, or Firm* — Eversheds Sutherland (US) LLP

(57) ABSTRACT

The invention relates to a lighting device (1) for a motor vehicle headlight, comprising a plurality of light sources, a light guide unit (3) that is made of a light-conducting solid body and comprises a plurality of light guides (3b), and a downstream projection lens (4) including a focal plane (E), each light guide (3b) comprising a light incoupling surface (3b') for coupling light of a light source (2) into the light guide (3b), the light guides (3b) converging toward a shared light outcoupling surface (3a) of the light guide unit (3), the light outcoupling surface (3a) being configured to radiate light into the projection lens (4) and being essentially located in the focal plane (E) of the projection lens (4), characterized in that the light guide unit (3) comprises at least one translucent deflection element (6), which extends along the light outcoupling surface (3a) in a rib-shaped (Continued)

manner and protrudes beyond the light outcoupling surface (3a) in the direction of the projection lens (4), or is formed as a recess inside the light outcoupling surface (3a) counter to this direction, the deflection element (6) being designed to at least partially deflect light entering the deflection element (6) from the light outcoupling surface (3a) in the direction of the projection lens (4).

19 Claims, 6 Drawing Sheets

(51) Int. Cl.
*F21S 41/141* (2018.01)
*F21S 41/33* (2018.01)
*F21S 41/25* (2018.01)
*F21S 41/151* (2018.01)

(52) U.S. Cl.
CPC ............ *F21S 41/172* (2018.01); *F21S 41/25* (2018.01); *F21S 41/337* (2018.01)

(56) References Cited

U.S. PATENT DOCUMENTS

| | | | |
|---|---|---|---|
| 9,879,835 B2 | 1/2018 | Taudt et al. | |
| 2008/0239740 A1* | 10/2008 | Nakada | F21S 41/147 362/507 |
| 2010/0053987 A1* | 3/2010 | Nakabayashi | F21S 41/255 362/538 |
| 2012/0008333 A1 | 1/2012 | Tomoaki | |
| 2014/0169014 A1 | 6/2014 | Jungwirth et al. | |
| 2014/0198513 A1 | 7/2014 | Stefanov et al. | |
| 2014/0307459 A1* | 10/2014 | Brendle | F21S 41/635 362/520 |
| 2015/0070926 A1 | 3/2015 | Stefanov et al. | |
| 2015/0167913 A1 | 6/2015 | Stefanov et al. | |
| 2016/0040848 A1 | 2/2016 | Tsukamoto | |

FOREIGN PATENT DOCUMENTS

| | | | | |
|---|---|---|---|---|
| EP | 2306075 A2 | * | 4/2011 | ............ F21S 41/153 |
| EP | 2587125 A2 | | 5/2013 | |
| EP | 2703852 B1 | | 12/2016 | |
| EP | 3354545 A1 | * | 8/2018 | .............. F21S 41/24 |
| EP | 3540296 A1 | * | 9/2019 | ............ F21S 41/143 |
| FR | 2994747 A1 | * | 2/2014 | ............ F21S 43/243 |
| JP | 2010086944 A | * | 4/2010 | ............ F21S 41/155 |

OTHER PUBLICATIONS

K. Nakagawa, "Lens Design Engineering," T. Adachi, Aug. 20, 2014, p. 191.

Japanese Office Action for JP Application No. 2019539268, dated Aug. 11, 2020. (7 pages).

* cited by examiner

LIGHTING DEVICE FOR A MOTOR VEHICLE HEADLIGHT

The invention relates to a lighting device for a motor vehicle headlight, comprising a plurality of light sources, a light guide unit that is made of a light-conducting solid body and comprises a plurality of light guides, and a downstream projection lens including a focal plane, wherein each light guide comprises a light incoupling surface for coupling light of a light source into the light guide, wherein the light guides converge toward a shared light outcoupling surface of the light guide unit, wherein the light outcoupling surface is configured to radiate light into the projection lens and is essentially located in the focal plane of the projection lens.

The invention further relates to a vehicle headlight comprising a lighting device according to the invention and to a motor vehicle comprising a lighting device according to the invention and/or a vehicle headlight according to the invention.

Lighting device of the type mentioned at the outset are known from document AT 513 341 A1. FIGS. 5 to 8 of AT 513 341 A1 show a light guide unit, which is configured to compensate for light inhomogeneities in the region of the light-dark boundary between the low-beam light and high-beam light distribution, wherein, for this purpose, the individual light guides make contact along different extensions, so that the light radiatable by individual light guides can blend at a defined distance in front of the focal plane of a downstream projection lens.

Steadily rising requirements with regard to the dimensions of the light modules, and in particular the desire for ever more compact lighting devices, have caused the height of the projection lens to be limited by so-called lens trim. The lens trim can take on such an extent that the light radiated by an upstream light guide device can no longer be completely imaged by the lens, and excess light impinging on the trimmed lens has to be absorbed, for example inside a vehicle headlight, often resulting in inhomogeneities in the light pattern and making the system more inefficient. Moreover, supplemental or alternative options are desirable for counteracting these inhomogeneities in the light pattern of lighting devices.

It is therefore an object of the invention to create a lighting device that enables a particularly compact design, while maintaining the high level of efficiency. This object is achieved by a lighting device of the type mentioned at the outset in that, according to the invention, the light guide unit comprises at least one translucent deflection element, which extends along the light outcoupling surface in a rib-shaped manner and protrudes beyond the light outcoupling surface in the direction of the projection lens, or is formed as a recess inside the light outcoupling surface counter to this direction, wherein the deflection element is designed to at least partially deflect light entering the deflection element from the light outcoupling surface in the direction of the projection lens. As a result of the lighting device according to the invention, it is possible to deflect light by means of at least one deflection element in such a way in the direction of the optical axis of the projection lens that light, which otherwise would radiate into the non-usable trimmed region of a lens, can now be deflected onto the effective region of the lens. In this way, the efficiency of the lighting device can be increased with a compact design. As an alternative or in addition, the deflection of light by the at least one deflection element can also be used to deflect light into an otherwise inhomogeneous region of the light distribution imaged by the projection lens.

Unless indicated otherwise, within the scope of the present disclosure, the expression "plurality" hereafter shall be understood to mean an arbitrary number greater than or equal to two. The number can thus be ten, twenty, thirty or more, for example. A person skilled in the art will be able to select the number of the respective elements in accordance with the lighting device to be dimensioned. The expression "transparent solid body" denotes a body that is free of cavities within the material of the body, and more specifically in such a way that the light conduction inside the body takes place in the interior of the body, so that an optical transition to the downstream medium takes place when light exits the solid body. Moreover, the expression "wherein the light outcoupling surface is configured to radiate light into the projection lens and is essentially located in the focal plane of the projection lens" shall be understood to mean an arrangement in which light can be radiated from of the light outcoupling surface toward the projection lens, wherein the statement "essentially located in the focal plane" shall be understood to mean that it is sought for the light outcoupling surface to be designed and disposed, to as great an extent as possible, so as to be located within the focal plane. In practice, due to field of curvature, the focal plane can likewise have a curvature and thus deviate from a planar shape. In this case, the light outcoupling surface can advantageously be designed so as to follow the "curved" focal plane, whereby aberrations can be reduced.

In particular, it may be provided that the deflection element extends along the entire width of the light outcoupling surface. The deflection element can thus act particularly effectively on the light distribution.

Moreover, it may be provided that the deflection element has a triangular cross-section. It may be favorable when the triangular cross-section is delimited by three legs, wherein a first leg of the triangle extends parallel to the optical axis, and a second leg extends parallel to the light outcoupling surface. As a result of the parallel orientation of the first leg with respect to the optical axis, it can be avoided that light that already exits the light outcoupling surface parallel to the optical axis above the deflection element is undesirably deflected by the deflection element. The statement according to which the second leg extends parallel to the light outcoupling surface shall be understood to mean an orientation that means that the second leg—even if this leg is not apparent from the outside, for example when the deflection element is formed in one piece with the solid body of the light guide unit, and the second leg thus continues the light outcoupling surface—extends at least "fictitiously" between the ends of the remaining two legs.

In particular, it may be provided that the triangular cross-section has a third leg, which connects an end of the first leg to an end of the second leg, wherein the angle of inclination between the second and third legs is between 5° and 40°. When such angles of inclination are adhered to, the deflection has proven to be particularly effective. The third leg does not have to be straight, but may be curved or arched, for example, and in particular be convexly or concavely curved.

In particular, it may be favorable when the light guide unit comprises two or more deflection elements, which are disposed on top of one another at the light outcoupling surface.

Moreover, it has proven to be favorable when the projection lens has an optical axis, and the light guide unit is disposed in such a way that the optical axis intersects the light outcoupling surface, wherein all deflection elements are disposed below the optical axis. As an alternative, it may be provided that individual deflection elements are disposed above the optical axis, for example so as to optimize the progression of the light distribution in the region of the far field. The closer the deflection elements are disposed to the optical axis of the projection lens, the less strongly the light beams exiting the light guide unit have to be deflected. For this reason, it may be favorable when the angle of inclination between the second and third legs of each deflection element is selected so that the angles of inclination of deflection elements disposed on top of one another decrease upon approaching the optical axis of the projection lens. In other words, this means that a deflection element disposed above has a smaller angle of inclination between the second and third legs of the deflection element than the deflection element disposed directly therebeneath when the deflection elements are located above the optical axis. The upper deflection elements thus protrude to a lesser degree beyond the light outcoupling surface. In particular, it may be provided that the decrease in said angle of inclination compared to the closest deflection element located beneath the respective deflection element is between 5 and 50%.

Moreover, it may be provided that deflection elements disposed on top of one another abut one another, whereby the deflection elements can be disposed in a particularly compact manner.

Moreover, it may be provided that the light guides of the light guide unit are disposed in at least two, and preferably three, rows located on top of one another, wherein the bottommost row couples light into an outcoupling section of the light outcoupling surface, wherein the deflection elements are only disposed within the lower half of the outcoupling section. This arrangement can be particularly favorable, in particular when the light guides of the bottommost row, in cooperation with the at least one deflection element and the projection lens, are configured to form a high-beam light distribution. As an alternative or in addition, deflection elements can also be disposed above the optical axis. For example, the far field light distribution can thus be positively influenced.

For the particularly compact design of the lighting device, it may be provided that the projection lens, at the upper and lower faces thereof, is trimmed in a manner that interrupts the continuous circumference thereof to reduce the height of the projection lens.

In particular, it may be provided that a light source is assigned to each light incoupling surface, whereby a headlight can be created, for example, in which individual light sources or light pattern segments assigned to the light sources can be illuminated or suppressed in a targeted manner.

It may be particularly favorable when the light sources are LEDs.

Another aspect of the invention relates to a vehicle headlight, and in particular to a motor vehicle headlight, comprising a lighting device according to the invention. It may be provided, in particular, in such vehicle headlights that the lighting device is disposed in such a way, and the deflection elements are designed in such a way, that the deflection elements extend along the light outcoupling surface in a horizontal direction when the vehicle headlight is installed, whereby targeted and uniform influencing of the light pattern in a horizontal direction can be ensured.

Moreover, the invention relates to a motor vehicle comprising at least one lighting device according to the invention and/or comprising at least one vehicle headlight according to the invention.

The projection lens is configured to image light in a region ahead of the motor vehicle in the form of at least one light distribution.

The invention will be described in greater detail hereafter based on exemplary and non-limiting embodiments, which are illustrated in the figures. In the drawings.

Identical features are denoted by identical reference numerals in the following figures, unless indicated otherwise.

Figure 1:
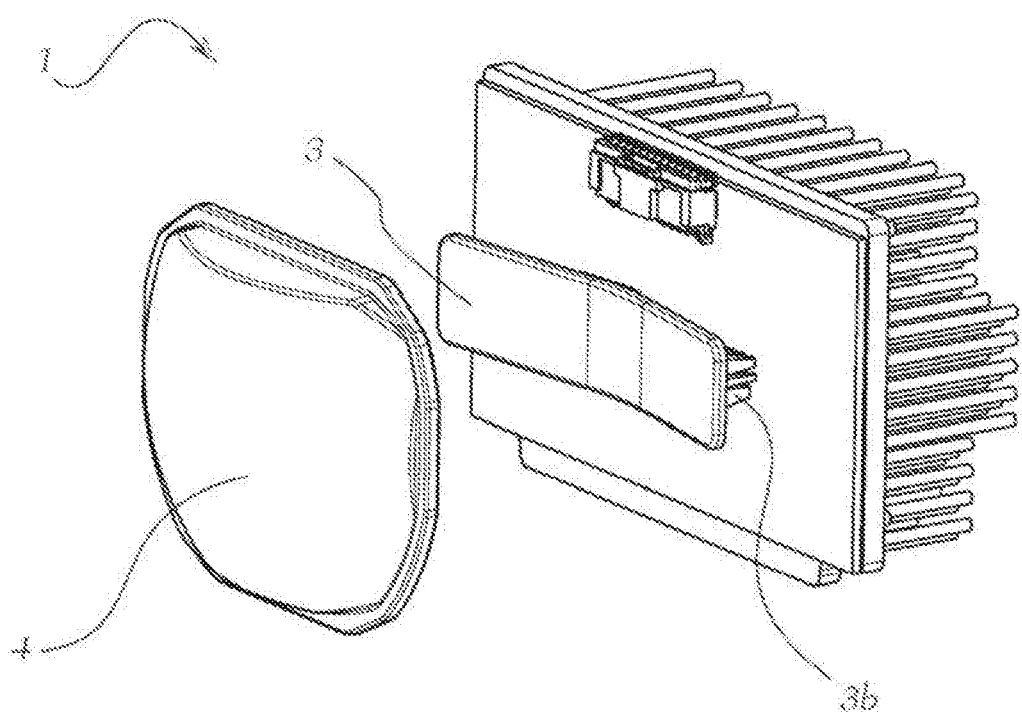
FIG. 1 shows a perspective illustration of a lighting device according to the prior art.
Figure 2:
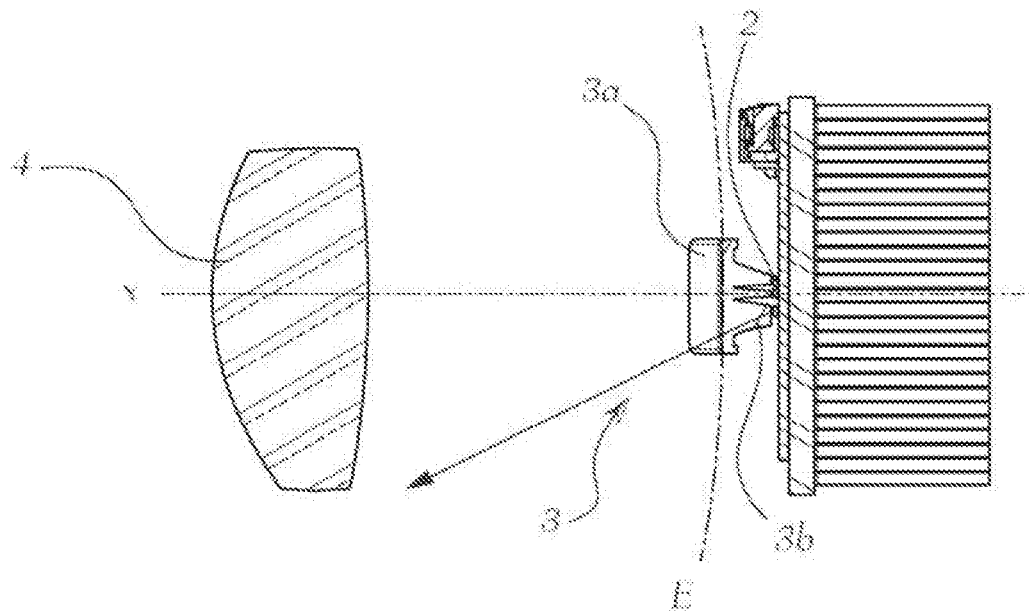
FIG. 2 shows a sectional illustration of the lighting device according to FIG. 1.

FIG. 1 shows a perspective illustration of a lighting device 1 according to the prior art. The lighting device 1 comprises a plurality of light sources 2 shown in FIG. 2, which shows a sectional illustration of the lighting device 1 according to FIG. 1. Moreover, the lighting device 1 comprises a light guide unit 3 that is made of a light-conducting solid body and comprises a plurality of light guides 3b. Such a light guide unit 3 is known from AT 513 341 A1, for example. The lighting device 1 moreover comprises a projection lens 4, which has an optical axis X, wherein the light guides 3b converge toward a shared light outcoupling surface 3a of the light guide unit 3. The light outcoupling surface 3a is configured to radiate light into the projection lens 4 and is essentially located in the focal plane of the projection lens 4.

Figures 3, 3A:
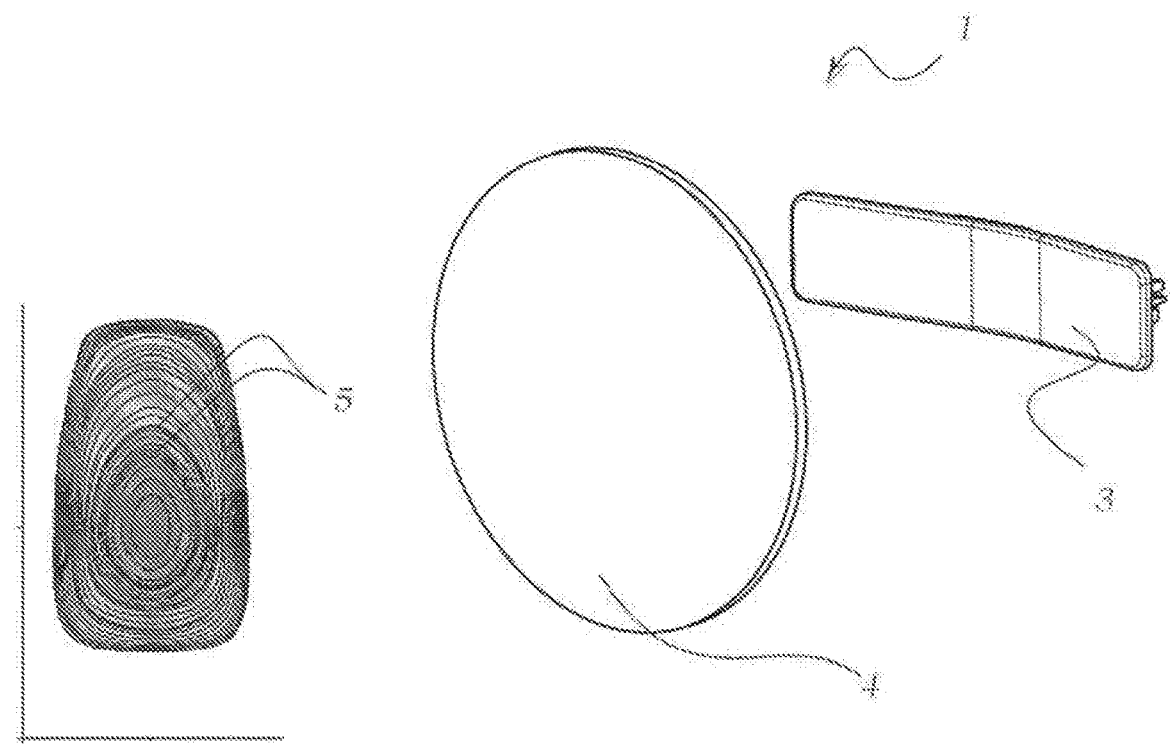
FIG. 3 shows a schematic illustration of a further embodiment of a lighting device according to the prior art.
FIG. 3a shows an exemplary light distribution of the lighting device upon activation of a single light guide/light source according to FIG. 3.

FIG. 3 shows a schematic representation of a further embodiment of a lighting device according to the prior art. A light guide unit 3 and a projection lens 4 are apparent, wherein the light guide unit 3, in contrast to the invention, does not comprise any deflection elements. FIG. 3a shows an exemplary light distribution upon activation of a single light guide 3b/light source 2 of the lighting device 1 according to FIG. 3, which is illustrated by isolines representing regions having the same luminous intensity. It is apparent that strong gradients in the light pattern or the light distribution of the lighting device 1 occur in the regions denoted by reference numeral 5, corresponding to how closely the isolines are located together. These strong luminous intensity gradients result in disadvantageous inhomogeneities in the light distribution.

Figures 4, 4A:
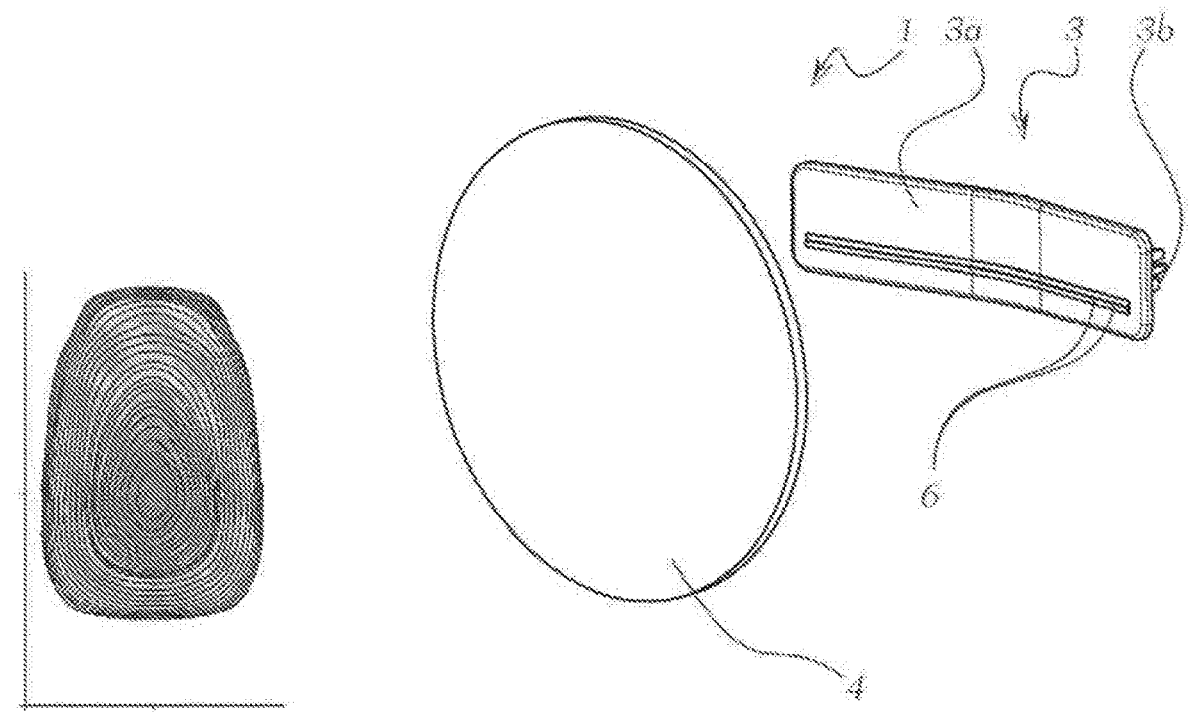
FIG. 4 shows a first embodiment of a lighting device according to the invention.
FIG. 4a shows an exemplary light distribution of the lighting device upon activation of a single light guide/light source according to FIG. 4.
Figure 5:
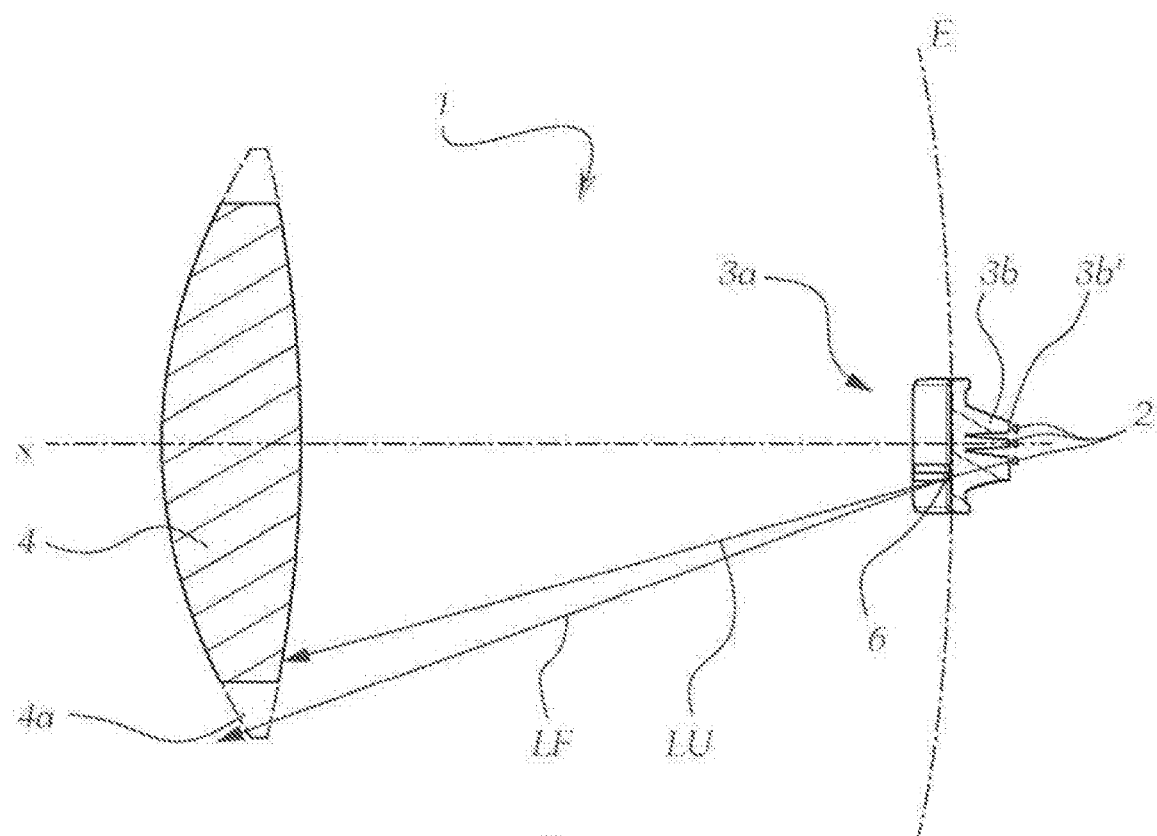
FIG. 5 shows an exemplary sectional illustration of a second embodiment of the lighting device according to the invention, with optical paths represented therein.

FIG. 4 shows a first embodiment of a lighting device 1 according to the invention, wherein the light sources 2 are not shown in the present perspective view. The lighting device 1 according to the invention comprises a plurality of light sources 2, a light guide unit 3 that is made of a light-conducting solid body comprising a plurality of light guides 3b, and a downstream projection lens 4 including a focal plane E and an optical axis X, which is shown in FIG. 5, for example. The light guide unit 3 comprises a light outcoupling surface 3a toward which the light guides 3b extend, wherein the light outcoupling surface 3a is configured to radiate light into the projection lens 4 and is essentially located in the focal plane E of the projection lens 4. In the first embodiment of the invention, which is shown in FIG. 4, the light guide unit 3 comprises two deflection elements 6, which extend along the light outcoupling surface 3a in a rib-shaped manner and protrude beyond the light outcoupling surface 3a in the direction of the projection lens 4. Both deflection elements 6 are translucent and configured to at least partially deflect light entering the deflection element 6 from the light outcoupling surface 3a in the direction of the projection lens 4. The deflection elements 6 extend along the light outcoupling surface 3a in the horizontal direction. FIG. 5 shows a sectional illustration of the lighting device 1 according to FIG. 4. The beam path of a lower light guide 3b is shown by way of example, wherein it is apparent how exiting light, which is represented by the exemplary light beams LU, is deflected by a deflection element 6 in the direction of the optical axis X of the projection lens. The deflection is apparent, in particular, from a comparison to the fictitious light beams LF, which represent the progression of the light beams if no deflection element 6 were provided. Moreover, it is apparent from FIG. 5 that the light guides 3b each comprise a light incoupling surface 3b', via which the light sources 2 are able to couple light into the light guide unit 3.

It is clearly apparent in FIG. 5 that the fictitious light beams LF would impinge on an outer region 4a of the projection lens 4, which is removed in compact projection lenses by trimming, for example. In this case, the light beams LF would no longer contribute to forming a light distribution, whereby the efficiency of the lighting device 1 would be decreased. In contrast, the provision of the deflection elements 6 allows these light beams to be deflected in the direction of the optical axis, as is represented by the exemplary light beams LU, whereby the efficiency of the lighting device can be maintained at the same high level, despite the compact design thereof.

Figure 6:
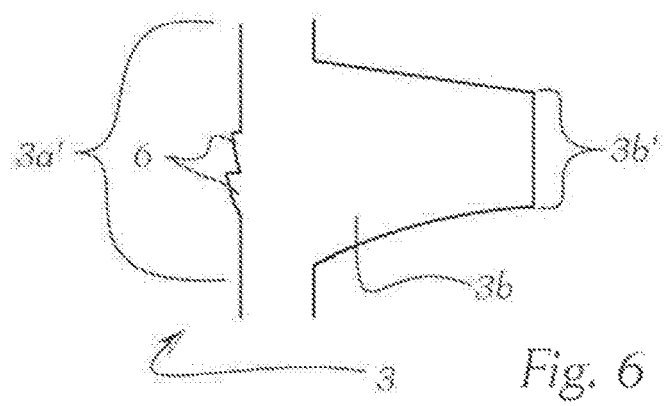
FIG. 6 shows a sectional illustration of a light guide unit according to the invention.

FIG. 6 shows a sectional illustration of an exemplary light guide unit 3 as it can be provided, for example, in the first embodiment of the invention. FIG. 6a shows a detailed illustration of FIG. 6 in which the deflection elements 6 are shown particularly clearly. It is apparent that the deflection elements 6 have a triangular cross-section, which is delimited by three legs, wherein a first leg S1 of the triangle extends parallel to the optical axis X, and a second leg S2 extends parallel to the light outcoupling surfaces 3a. The third leg S3 connects the ends of the first and second legs S1 and S2 to form a triangle, wherein an angle of inclination α is enclosed between the second and third legs, which denotes the inclination of the third leg S3 with respect to the second leg S2. This angle of inclination is typically between 5° and 40°, where applies: the larger the angle of inclination is selected, the further a deflection element protrudes beyond the light outcoupling surface 3a. The third leg S3 does not necessarily have to be straight. A deflection element 6 typically has a height h of 0.5 to 2 mm, wherein the depth t of the deflection element 6 can range between 0.1 and 0.5 mm, for example. In the present example, two deflection elements that are disposed on top of one another directly abut one another, whereby it can be avoided that light exits the light outcoupling surface 3a without being deflected between the deflection elements 6. The angles of inclination α of deflection elements 6 disposed on top of one another do not necessarily have to be identical, but can deviate from one another. It has proven to be favorable, for example, that angles of inclination α of deflection elements 6 disposed on top of one another decrease when increasingly approaching the optical axis X. For example, the angle of inclination $α_1$ of the lower deflection element 6 can be greater than the angle of inclination $α_2$ of the deflection element 6 disposed directly above, and so forth.

Figure 6B:
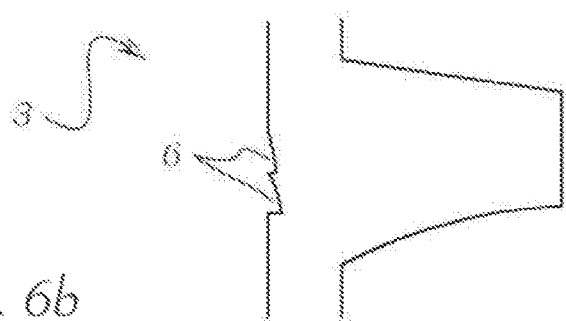
FIG. 6b shows an exemplary alternative embodiment of the invention, according to which the translucent deflection element is designed as a recess within the light outcoupling surface counter to the direction of the projection lens.
Figure 6A:
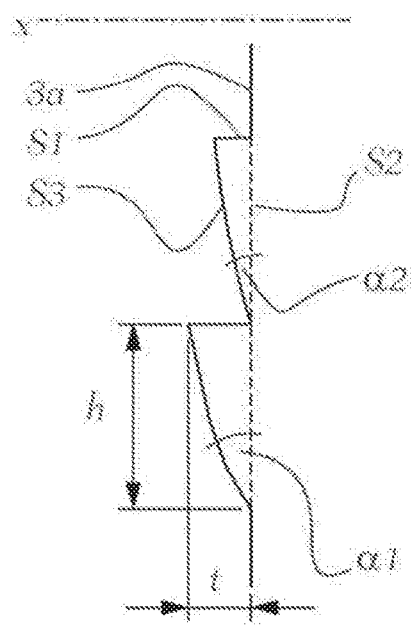
FIG. 6a shows a detail of FIG. 6.

FIG. 6b shows an exemplary alternative embodiment of the invention in which the translucent deflection elements 6 are designed as a recess within the light outcoupling surface 3a counter to the direction of the projection lens 4. The deflection elements 6 can thus be designed as a recess within the light outcoupling surface 3a, for example, wherein the recess, in principle, can have the same shape as a deflection element 6 protruding from the light outcoupling surface 3a in the direction of the projection lens 4.

Figure 7:
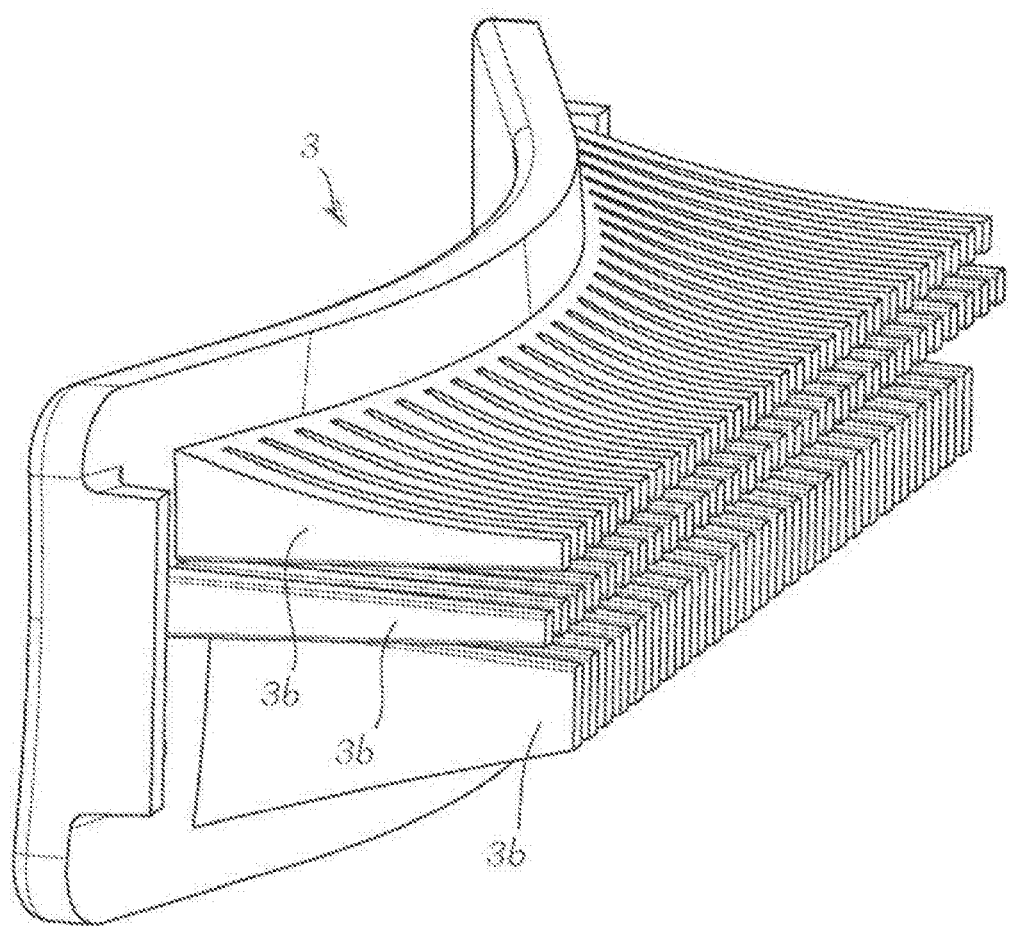
FIG. 7 shows a perspective illustration of a light guide unit.

FIG. 7 shows a perspective illustration of a light guide unit 3 according to the present invention, wherein light guides 3b are clearly apparent, and the light sources 2 assigned to the light guides 3b are not shown for the sake of clarity. The light guides 3b of the light guide unit 3 are disposed in three rows located on top of one another in this example, wherein the bottommost row couples light into an outcoupling section 3a' (see also FIG. 6) of the light outcoupling surface 3, wherein the deflection elements are only disposed within the lower half of the outcoupling section 3a'. The light guides 3b of the bottommost row, in cooperation with the deflection elements 6 and the projection lens 4, are configured to form a high-beam light distribution, wherein light, for this purpose, is irradiated via light sources 2 into the light guides 3b.

Figures 8, 8A:
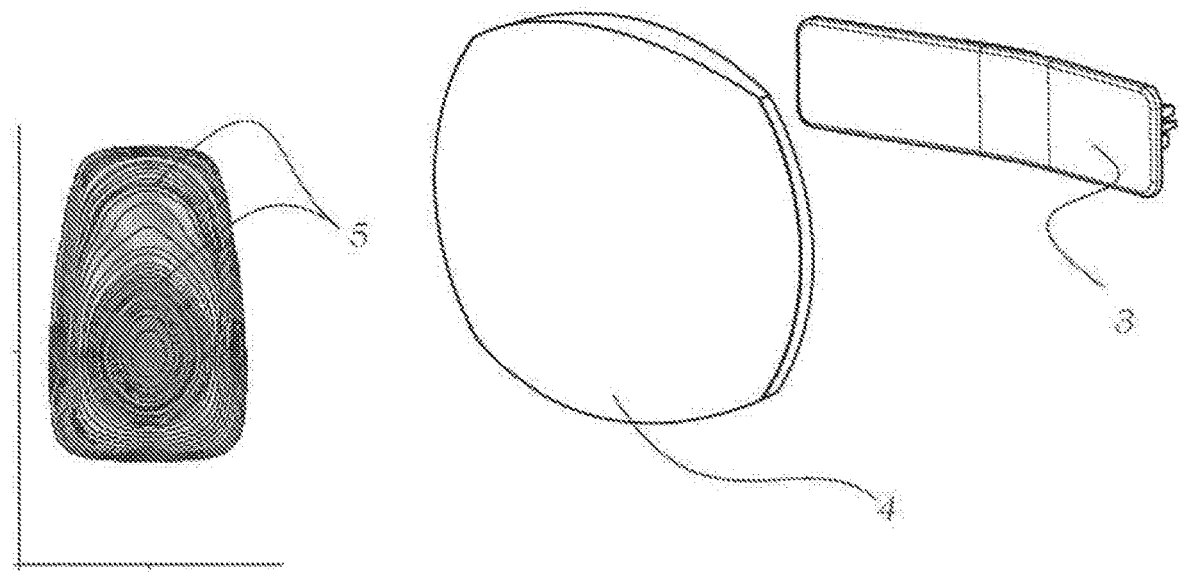
FIG. 8 shows a further lighting device according to the prior art comprising a trimmed lens.
FIG. 8a shows the light distribution of the lighting device according to FIG. 8 upon activation of a single light guide/light source.

FIG. 8 shows a further lighting device according to the prior art, in which a trimmed projection lens 4 is shown. FIG. 8a shows the light distribution of the lighting device according to FIG. 8, in which inhomogeneous regions 5 are apparent.

Figures 9, 9A:
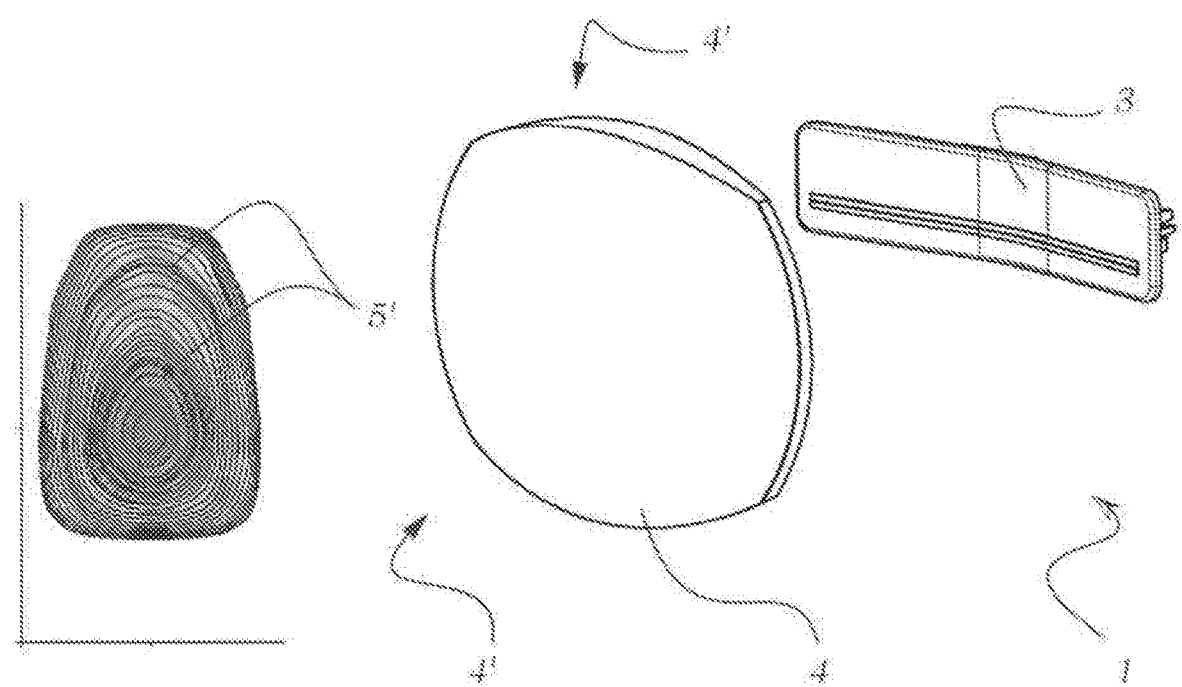
FIG. 9 shows a third embodiment of a lighting device according to the invention.
FIG. 9a shows the light distribution of the lighting device according to FIG. 9 upon activation of a single light guide/light source.

FIG. 9 shows a third embodiment of a lighting device according to the invention. The arrangement differs from that according to FIG. 8 in that the light guide unit 3 comprises the aforementioned deflection elements 6. FIG. 9a shows the light distribution of the lighting device according to FIG. 9, in which the previously inhomogeneous regions are now considerably improved and denoted by reference numeral 5'.

Figures 10, 10A:
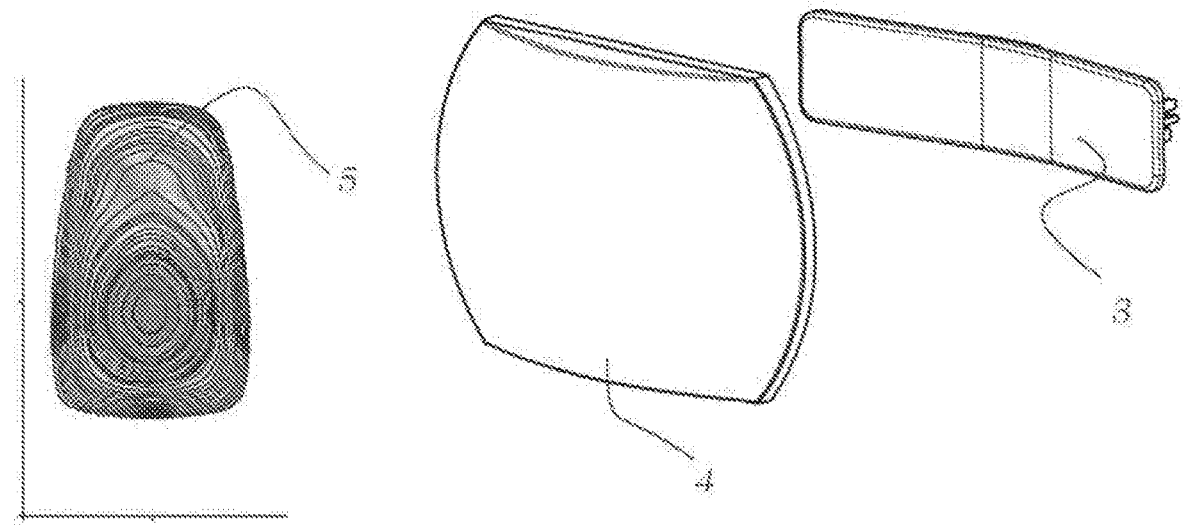
FIG. 10 shows a further lighting device according to the prior art.
FIG. 10a shows the light distribution of the lighting device according to FIG. 10 upon activation of a single light guide/light source.

FIG. 10 shows a further lighting device according to the prior art, in which the trimming of the lens is considerably more pronounced than in the embodiment according to FIG. 8. For example, the lens height is now 53 mm instead of 65 mm according to FIG. 8 or, for example, 90 mm of an untrimmed lens. FIG. 10a shows the light distribution of the lighting device according to FIG. 10, wherein an inhomogeneous region is highlighted by reference numeral 5.

Figures 11, 11A:
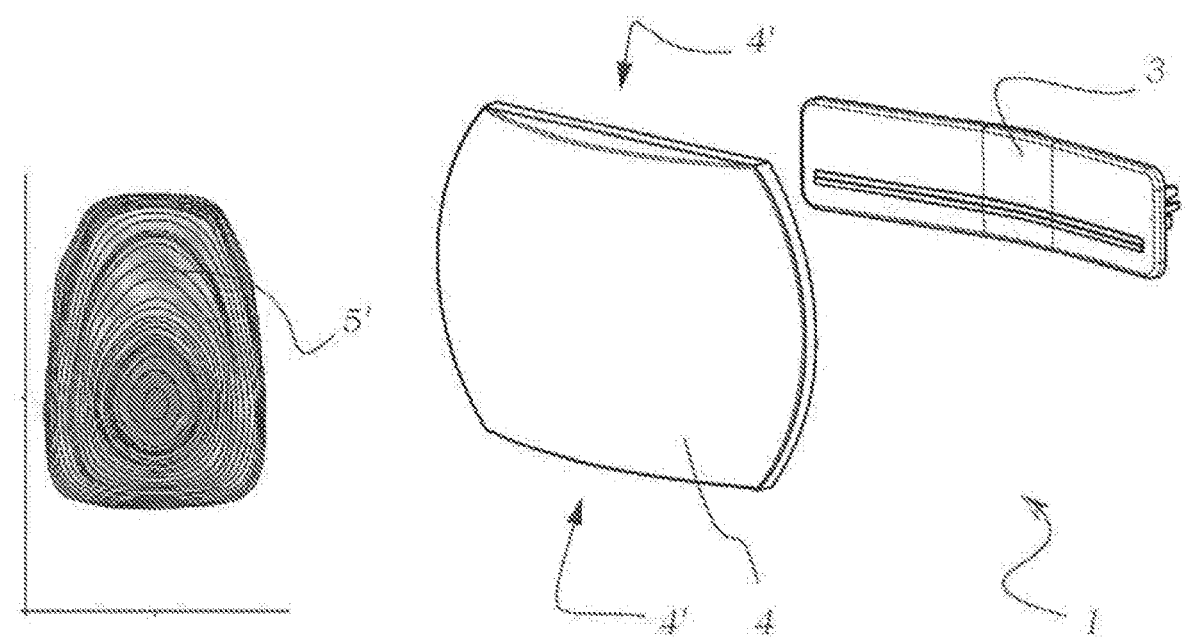
FIG. 11 shows a fourth embodiment of a lighting device according to the invention.
FIG. 11a shows the light distribution of the lighting device upon activation of a single light guide/light source according to FIG. 11.

FIG. 11 shows a fourth embodiment of a lighting device 1 according to the invention, which likewise has a trim of the projection lens 4 to a lens height of 53 mm, for example, and FIG. 11a shows the associated light distribution. It is clearly apparent that the inhomogeneity that was apparent in the region 5 of FIG. 10a was able to be compensated for in the region 5' of FIG. 11a by the deflection elements 6. It is also clearly apparent in FIG. 11 that the projection lens 4, at the upper and lower faces thereof, has a trim 4' that interrupts the continuous circumference thereof to reduce the height of the projection lens.

In view of this teaching, a person skilled in the art will be able to arrive at other embodiments of the invention that are not shown, without exercising inventive skill. The invention is thus not limited to the shown embodiments. It is also possible to select individual aspects of the invention or of the embodiments and combine these with one another. What is essential is the concepts underlying the invention, which a person skilled in the art having knowledge of this description will be able to carry out in a variety of ways and which nonetheless can be maintained per se.

The invention claimed is:

1. A lighting device (1) for a motor vehicle headlight, comprising:
   a plurality of light sources;
   a light guide unit (3) that is made of a light-conducting solid body and comprises a plurality of light guides (3b); and
   a downstream projection lens (4) including a focal plane (E),
   wherein each light guide (3b) comprises a light incoupling surface (3b') for coupling light of a light source (2) into the light guide (3b), the light guides (3b) converging toward a shared light outcoupling surface (3a) of the light guide unit (3), the light outcoupling surface (3a) being configured to radiate light into the projection lens (4) and being essentially located in the focal plane (E) of the projection lens (4),
   wherein the light guide unit (3) comprises at least one translucent deflection element (6), which extends along the light outcoupling surface (3a) in a rib-shaped manner and protrudes beyond the light outcoupling surface (3a) in the direction of the projection lens (4), or is formed as a recess inside the light outcoupling surface (3a) counter to this direction, the deflection element (6) being designed to at least partially deflect light entering the deflection element (6) from the light outcoupling surface (3a) in the direction of the projection lens (4), the deflection element (6) having a triangular cross-section, and
   wherein the triangular cross-section is delimited by three legs (S1, S2, S3), a first leg (S1) of the triangle extending parallel to the optical axis (X), and a second leg (S2) extending parallel to the light outcoupling surface (3a).

2. The lighting device (1) according to claim 1, wherein the deflection element (6) extends along the entire width of the light outcoupling surface (3a).

3. The lighting device (1) according to claim 1, wherein the triangular cross-section has a third leg (S3), which connects an end of the first leg (S1) to an end of the second leg (S2), the angle of inclination ($\alpha$, $\alpha_1$, $\alpha_2$) between the second and third legs (S3) being between 5° and 40°.

4. The lighting device (1) according to claim 3, wherein the projection lens (4) has an optical axis (X), and the light guide unit (3) is disposed in such a way that the optical axis (X) intersects the light outcoupling surface (3a), all deflection elements (6) being disposed below the optical axis (X).

5. The lighting device (1) according to claim 4, wherein the angle of inclination ($\alpha$, $\alpha_1$, $\alpha_2$) between the second and third legs of each deflection element (6) is selected so that the angles of inclination ($\alpha$, $\alpha_1$, $\alpha_2$) of deflection elements (6) that are disposed on top of one another decrease upon approaching the optical axis (X) of the projection lens (4).

6. The lighting device (1) according to claim 5, wherein the decrease in the angle of inclination ($\alpha$, $\alpha_1$, $\alpha_2$) of a respective deflection element (6) compared to the closest deflection element (6) located beneath the respective deflection element (6) is between 5 and 50%.

7. The lighting device (1) according to claim 1, wherein the light guides (3b) of the light guide unit (3) are disposed in at least two rows located on top of one another, the bottommost row coupling light into an outcoupling section (3a') of the light outcoupling surface (3a), the deflection elements (6) being only disposed within the lower half of the outcoupling section (3a').

8. The lighting device (1) according to claim 7, wherein the light guides (3b) of the bottommost row, in cooperation with the at least one deflection element (6) and the projection lens (4), are configured to form a high-beam light distribution.

9. The lighting device (1) according to claim 1, wherein a light source (2) is assigned to each light incoupling surface (3b').

10. The lighting device (1) according to claim 1, wherein the light sources (2) are LEDs.

11. A vehicle headlight, and in particular a motor vehicle headlight, comprising the lighting device (1) according to claim 1.

12. The vehicle headlight according to claim 11, wherein the lighting device (1) is disposed in such a way, and the deflection elements (6) are designed in such a way, that the deflection elements (6) extend along the light outcoupling surface (3a) in a horizontal direction when the vehicle headlight is installed.

13. A motor vehicle comprising at least one lighting device (1) according to claim 1.

14. The lighting device (1) according to claim 7, wherein the light guides (3b) of the light guide unit (3) are disposed in three rows located on top of one another.

15. The lighting device (1) according to claim 1, wherein the light guide unit (3) comprises two or more deflection elements (6), which are disposed on top of one another at the light outcoupling surface (3a).

16. The lighting device (1) according to claim 1, wherein the projection lens (4), at the upper and lower faces thereof, has a trim (4') interrupting the continuous circumference thereof to reduce the height of the projection lens (4).

17. A lighting device (1) for a motor vehicle headlight, comprising:
   a plurality of light sources;

a light guide unit (3) that is made of a light-conducting solid body and comprises a plurality of light guides (3b); and a downstream projection lens (4) including a focal plane (E), wherein each light guide (3b) comprises a light incoupling surface (3b') for coupling light of a light source (2) into the light guide (3b), the light guides (3b) converging toward a shared light outcoupling surface (3a) of the light guide unit (3), the light outcoupling surface (3a) being configured to radiate light into the projection lens (4) and being essentially located in the focal plane (E) of the projection lens (4), wherein the light guide unit (3) comprises at least one translucent deflection element (6), which extends along the light outcoupling surface (3a) in a rib-shaped manner and protrudes beyond the light outcoupling surface (3a) in the direction of the projection lens (4), or is formed as a recess inside the light outcoupling surface (3a) counter to this direction, the deflection element (6) being designed to at least partially deflect light entering the deflection element (6) from the light outcoupling surface (3a) in the direction of the projection lens (4), the deflection element (6) having a triangular cross-section, and wherein the light guide unit (3) comprises two or more deflection elements (6), which are disposed on top of one another at the light outcoupling surface (3a).

18. The lighting device (1) according to claim 17, wherein deflection elements (6) disposed on top of one another abut one another.

19. A lighting device (1) for a motor vehicle headlight, comprising:

a plurality of light sources;

a light guide unit (3) that is made of a light-conducting solid body and comprises a plurality of light guides (3b); and a downstream projection lens (4) including a focal plane (E), wherein each light guide (3b) comprises a light incoupling surface (3b') for coupling light of a light source (2) into the light guide (3b), the light guides (3b) converging toward a shared light outcoupling surface (3a) of the light guide unit (3), the light outcoupling surface (3a) being configured to radiate light into the projection lens (4) and being essentially located in the focal plane (E) of the projection lens (4), wherein the light guide unit (3) comprises at least one translucent deflection element (6), which extends along the light outcoupling surface (3a) in a rib-shaped manner and protrudes beyond the light outcoupling surface (3a) in the direction of the projection lens (4), or is formed as a recess inside the light outcoupling surface (3a) counter to this direction, the deflection element (6) being designed to at least partially deflect light entering the deflection element (6) from the light outcoupling surface (3a) in the direction of the projection lens (4), the deflection element (6) having a triangular cross-section, and wherein the projection lens (4), at the upper and lower faces thereof, has a trim (4') interrupting the continuous circumference thereof to reduce the height of the projection lens (4).

* * * * *